United States Patent
Susca et al.

(10) Patent No.: US 12,031,487 B1
(45) Date of Patent: Jul. 9, 2024

(54) FUEL SYSTEM HAVING VARIABLE DISPLACEMENT PUMP FAILURE MODES

(71) Applicant: Hamilton Sundstrand Corporation, Charlotte, NC (US)

(72) Inventors: Ryan Prescott Susca, Windsor, CT (US); Ryan Shook, Loves Park, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 18/214,250

(22) Filed: Jun. 26, 2023

(51) Int. Cl.
*F02C 7/232* (2006.01)
*F02C 7/236* (2006.01)
*F02C 9/30* (2006.01)

(52) U.S. Cl.
CPC .............. *F02C 7/232* (2013.01); *F02C 7/236* (2013.01); *F02C 9/30* (2013.01); *F05D 2260/84* (2013.01)

(58) Field of Classification Search
CPC .. F02C 7/22; F02C 7/222; F02C 7/232; F02C 7/236; F02C 9/46; F04B 41/06; F04D 15/0072; F02M 37/18
See application file for complete search history.

(56) References Cited

U.S. PATENT DOCUMENTS

| | | | | | |
|---|---|---|---|---|---|
| 3,011,308 | A * | 12/1961 | Wotring | ................... | F04C 14/02 60/243 |
| 5,116,362 | A * | 5/1992 | Arline | .................... | F02C 7/236 60/734 |
| 5,159,808 | A * | 11/1992 | Kast | ....................... | F02M 37/18 60/734 |
| 5,168,704 | A * | 12/1992 | Kast | ......................... | F02C 9/48 60/420 |
| 6,981,359 | B2 * | 1/2006 | Wernberg | ................ | F02C 7/232 60/734 |
| 7,096,658 | B2 * | 8/2006 | Wernberg | ................ | F02C 9/263 137/613 |
| 7,185,485 | B2 * | 3/2007 | Lewis | ..................... | F02C 9/263 60/764 |
| 7,610,760 | B2 | 11/2009 | Clements | | |
| 9,657,643 | B2 * | 5/2017 | Veilleux, Jr. | ............ | F02C 7/236 |
| 11,203,978 | B2 * | 12/2021 | O'Rorke | ................... | F02C 7/236 |
| 11,629,643 | B1 * | 4/2023 | Susca | ...................... | F02C 7/236 60/206 |
| 2003/0074884 | A1 * | 4/2003 | Snow | ....................... | F02C 9/48 60/764 |

(Continued)

*Primary Examiner* — Alain Chau
(74) *Attorney, Agent, or Firm* — Kinney & Lange, P. A.

(57) ABSTRACT

A fuel system can include a main fuel pump (MFP) configured to output main flow to a main line, an augmentor fuel pump (AFP) configured to output an augmenter flow to an augmenter line, and a variable displacement pump assembly (VDPP) in fluid communication with the AFP via the augmentor line to receive the augmentor flow. The VDPP can include a variable displacement pump (VDP) configured to output a VDP flow to a VDP output line. The system can include a main fuel throttle valve assembly (MFTV) in fluid communication with the main fuel pump via the main line to receive the main flow and in fluid communication with the VDPP via a backup line. The MFTV can be in fluid communication with an engine line, an actuation assembly in fluid communication with the VDPP via an actuation line to receive an actuation flow.

17 Claims, 4 Drawing Sheets

(56) References Cited

U.S. PATENT DOCUMENTS

| | | | |
|---|---|---|---|
| 2005/0050897 A1* | 3/2005 | Lewis | F02C 9/263 |
| | | | 60/764 |
| 2005/0217236 A1* | 10/2005 | Wernberg | F02C 9/30 |
| | | | 60/39.281 |
| 2015/0101339 A1* | 4/2015 | Veilleux, Jr. | F02C 7/236 |
| | | | 60/734 |
| 2016/0053689 A1* | 2/2016 | Morton | F02C 3/04 |
| | | | 60/734 |
| 2018/0050812 A1* | 2/2018 | Ribarov | F02C 7/236 |
| 2018/0340501 A1 | 11/2018 | Ni et al. | |
| 2021/0222625 A1* | 7/2021 | O'Rorke | F02C 7/236 |
| 2023/0023310 A1 | 1/2023 | Goy | |
| 2023/0167773 A1* | 6/2023 | Susca | F01D 21/003 |
| | | | 417/2 |

\* cited by examiner

FUEL SYSTEM HAVING VARIABLE DISPLACEMENT PUMP FAILURE MODES

FIELD

This disclosure relates to fuel systems, e.g., for aircraft.

BACKGROUND

It is desirable to reduce fuel system weight and pump system heat rejection to allow aircraft to carry more fuel and increase aircraft heat rejection into the fuel. Conventional methods and systems have generally been considered satisfactory for their intended purpose. However, there is still a need in the art for improvements. The present disclosure provides a solution for this need.

SUMMARY

A fuel system can include a main fuel pump (MFP) configured to output main flow to a main line, an augmentor fuel pump (AFP) configured to output an augmenter flow to an augmenter line, and a variable displacement pump assembly (VDPP) in fluid communication with the AFP via the augmentor line to receive the augmentor flow. The VDPP can include a variable displacement pump (VDP) configured to output a VDP flow to a VDP output line. The system can include a main fuel throttle valve assembly (MFTV) in fluid communication with the main fuel pump via the main line to receive the main flow and in fluid communication with the VDPP via a backup line. The MFTV can be in fluid communication with an engine line, an actuation assembly in fluid communication with the VDPP via an actuation line to receive an actuation flow.

In certain embodiments, in a start mode, the VDPP can be configured to output the VDP flow to the actuation line and the backup line, and the MFTV can be configured to output the VDP flow to the engine line. In certain embodiments, in a run mode, the VDPP can be configured to output the VDP flow to the actuation line and the backup line, and wherein the MFTV can be configured to output the main flow to the engine line. In certain embodiments, in an initial VDP failure mode, the MFTV can be configured to output the main flow to the backup line to provide the VDPP with the main flow as well as provide main flow to the engine line, and the VDPP can be configured to output the main flow to the actuation line to provide the main flow to the actuation assembly. In certain embodiments, in a VDP failure mode, the MFTV can be configured to output the main flow to the backup line to provide the VDPP with the main flow as well as provide main flow to the engine line, and the VDPP can be configured to output the augmentor flow to the actuation line to provide the augmentor flow to the actuation assembly.

In certain embodiments, the system can include an augmentor fuel control in fluid communication with the MFTV via an augmentor fuel control line and configured to receive an augmentor fuel control flow from the MFTV. In certain embodiments, the MFTV includes a regulator connected between the backup line and the augmentor fuel control line such that the regulator receives flow from the backup line and outputs the augmentor fuel control flow.

In certain embodiments, the MFTV can include an MFTV check valve (CV) disposed between the main line and the backup line. The MFTV CV can be configured to open in the initial VDP failure mode to fluidly communicate the main line with the backup line to provide main flow to the VDPP.

In certain embodiments, the MFTV can include a selector valve (SV) connected between the backup line, the main line, and the engine line. The SV can be configured to select between the main line and the backup line to fluidly communicate with the engine line.

In certain embodiments, in the start-up mode, the SV can be configured to select the backup line to fluidly communicate with the engine line. In certain embodiments, in all other modes (e.g., the run mode, the initial VDP failure mode, and the VDP failure mode), the SV can be configured to select the main line to fluidly communicate with the engine line.

In certain embodiments, the VDPP can include one or more valves configured to enable to the start mode, the run mode, the initial VDP failure mode, and the VDP failure mode. In certain embodiments, the one or more valves can include an actuation selector valve (ASV) in fluid communication with the AFP and the VDP. The ASV can be configured to select between the VDP output line and the augmentor line to fluidly communicate with an ASV output line and the actuation line. In certain embodiments, the one or more valves can include a backup selector valve (GGSV) connected between the ASV output line and the backup line.

In certain embodiments, in the startup mode, the run mode, and the initial VDP failure mode, the ASV can be configured to be in a first position to select the VDP output line to fluidly communicate with the ASV output line and the actuation line to provide VDP flow to the ASV output line and the actuation line, and the GGSV can be configured to be in an open position to fluidly communicate the ASV output line and the backup line to provide VDP flow to the backup line. In certain embodiments, in the VDP failure mode, the ASV can be configured to be in a second position to select the augmentor line to be in fluid communication with the ASV output line and the actuation line to provide augmentor flow to the ASV output line and the actuation line, and the GGSV can be configured to be in a closed position to prevent fluid communication of the ASV output line and the backup line.

In certain embodiments, the ASV and the GGSV are pressure controlled. In certain embodiments, the VDPP can include a solenoid in fluid communication with the augmentor line and an input line to output a solenoid control pressure to each of the ASV and the GGSV. In certain embodiments, the ASV can be biased to the second position and can include a first ASV control port connected to the input line and a second ASV control port connected to the solenoid to receive the solenoid control pressure. In certain embodiments, the GGSV can be biased to the closed position and can include a first GGSV port in fluid communication with the input line, and a second GGSV port in fluid communication with the solenoid to receive the solenoid control pressure. In certain embodiments, the VDPP can include a VDP check valve (CV) configured to prevent backflow to the VDP. (e.g., in the initial VDP failure mode).

In certain embodiments, the MFP can include one or more centrifugal pumps. In certain embodiments, the system can include a boost pump connected configured to provide boost pressure to an input line. In certain embodiments, the system can include a heat exchanger on the main line. In certain embodiments, the MFP can include a thermal recirculation line in fluid communication with the main line.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
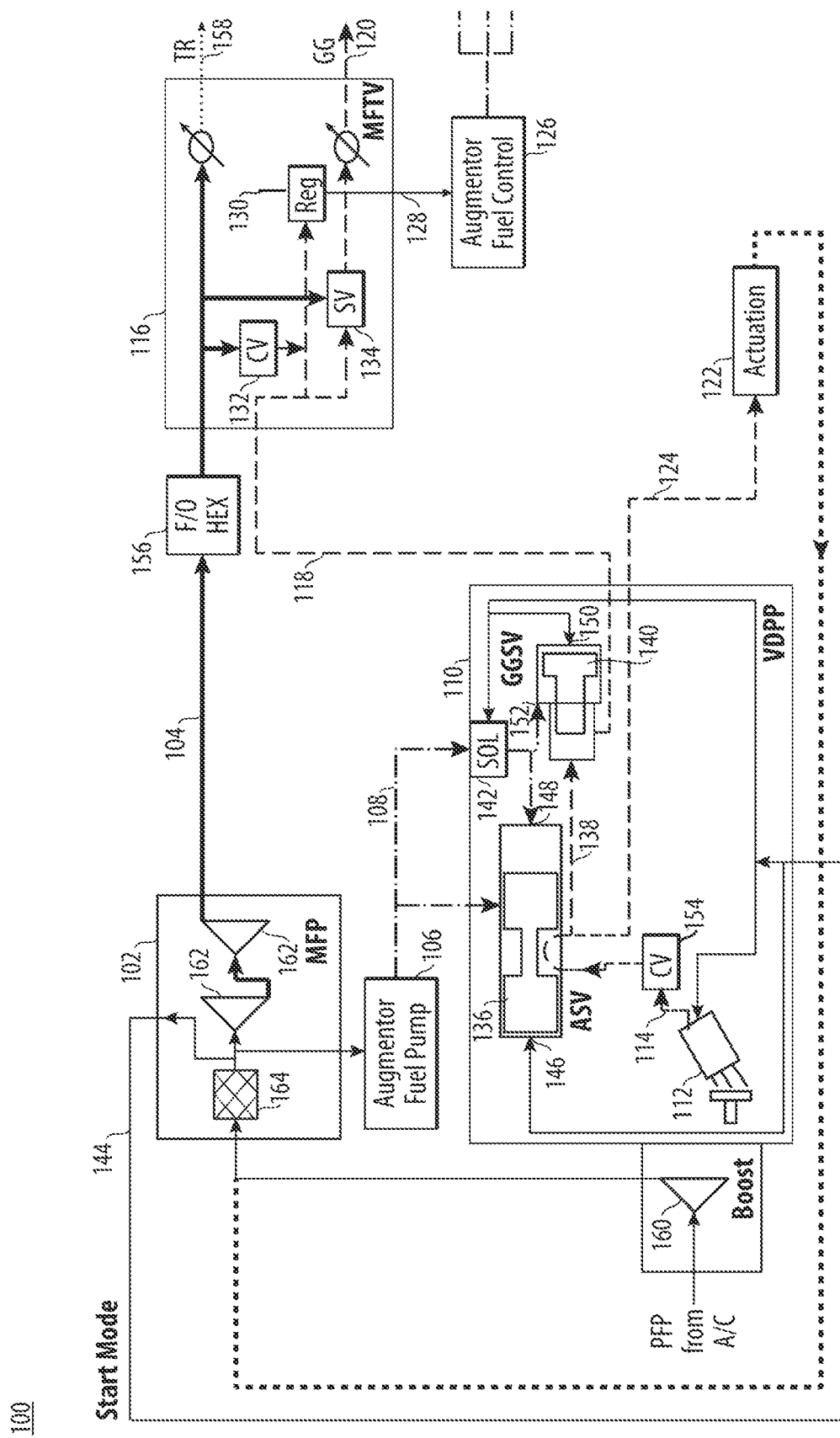
FIG. 1 is a schematic diagram of an embodiment of a fuel system in accordance with this disclosure, shown in a startup mode.
Figure 2:
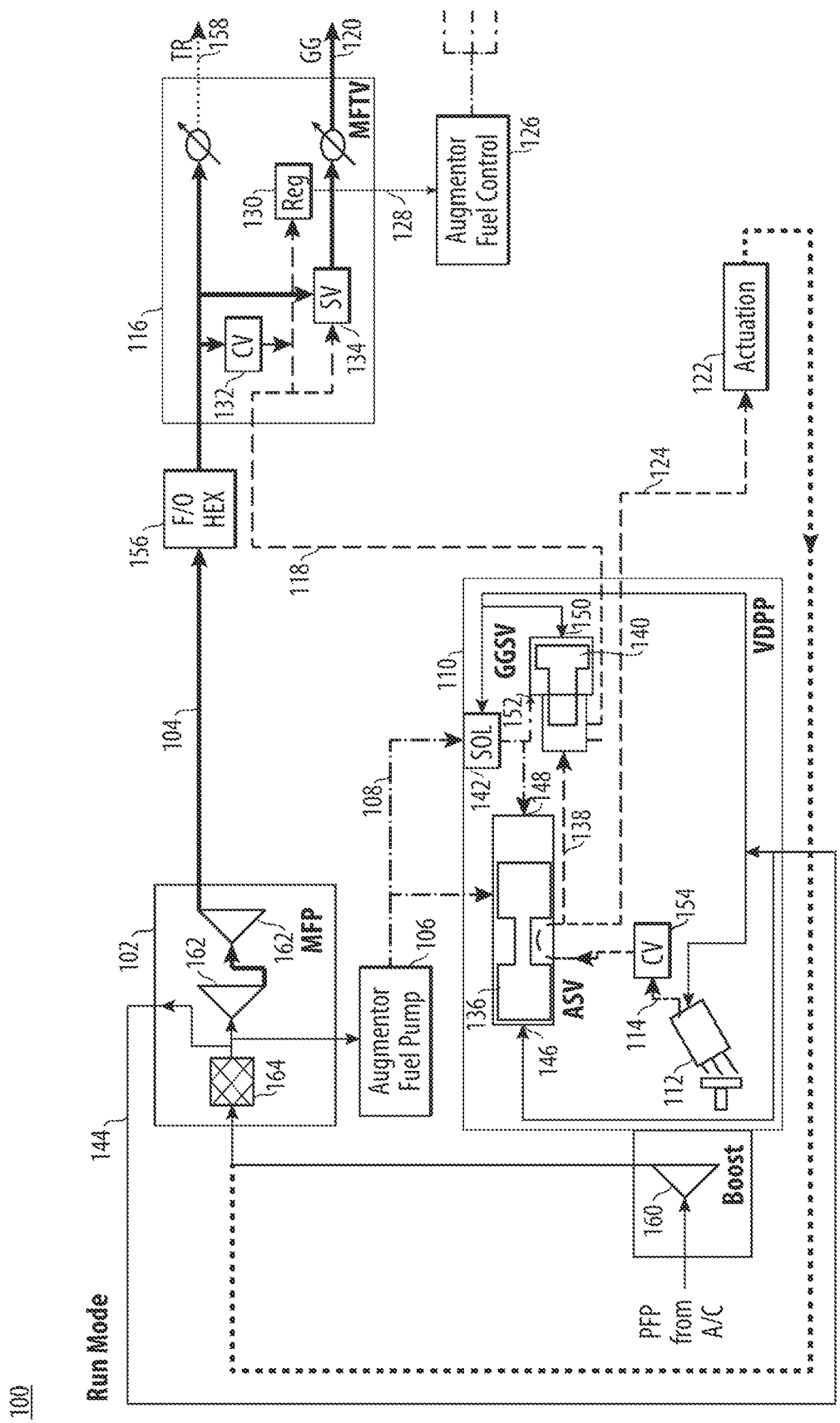
FIG. 2 is a schematic diagram of an embodiment of a fuel system in accordance with this disclosure, shown in a run mode.
Figure 3:
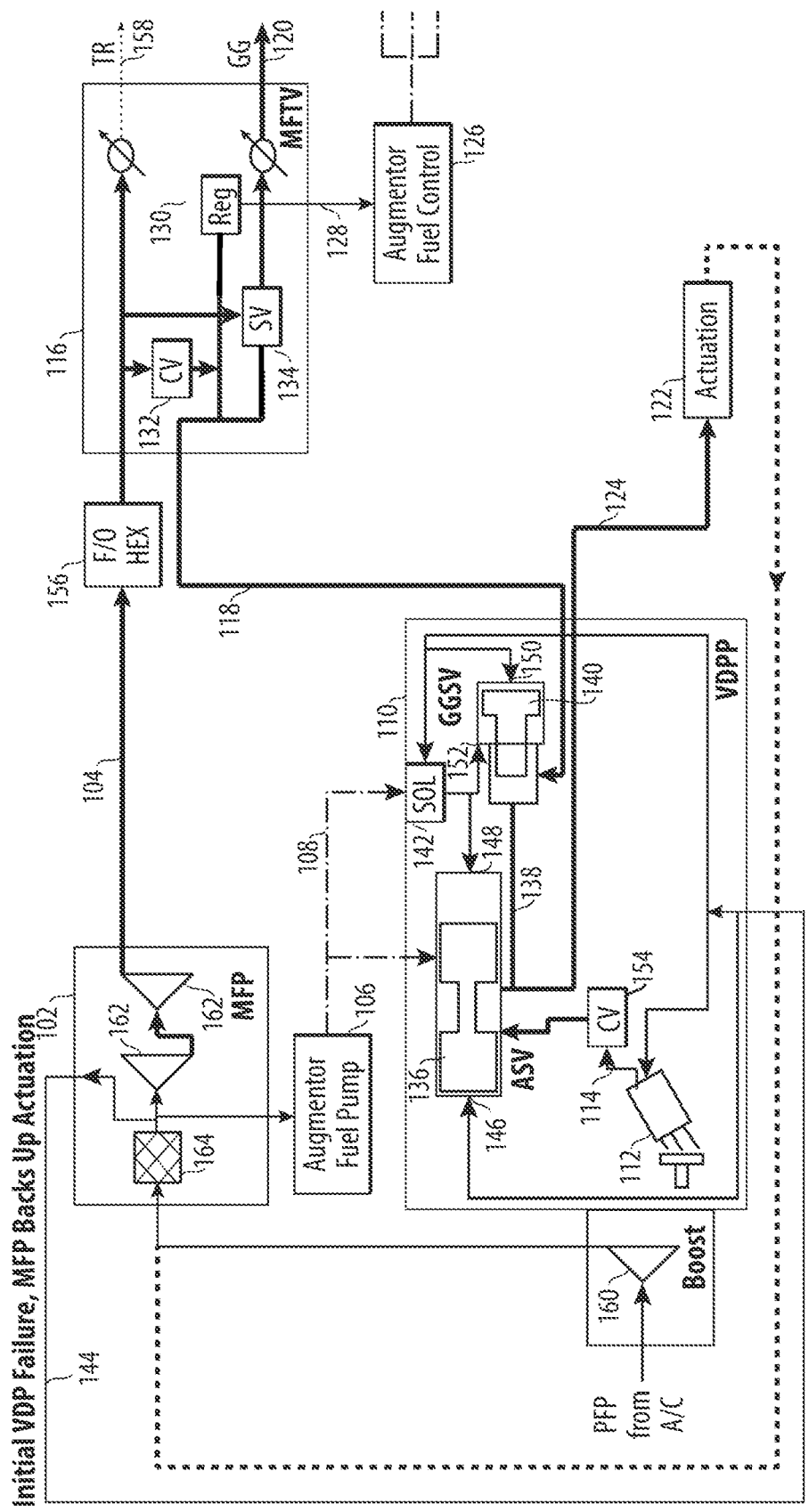
FIG. 3 is a schematic diagram of an embodiment of a fuel system in accordance with this disclosure, shown in an initial variable displacement pump (VDP) failure mode.
Figure 4:
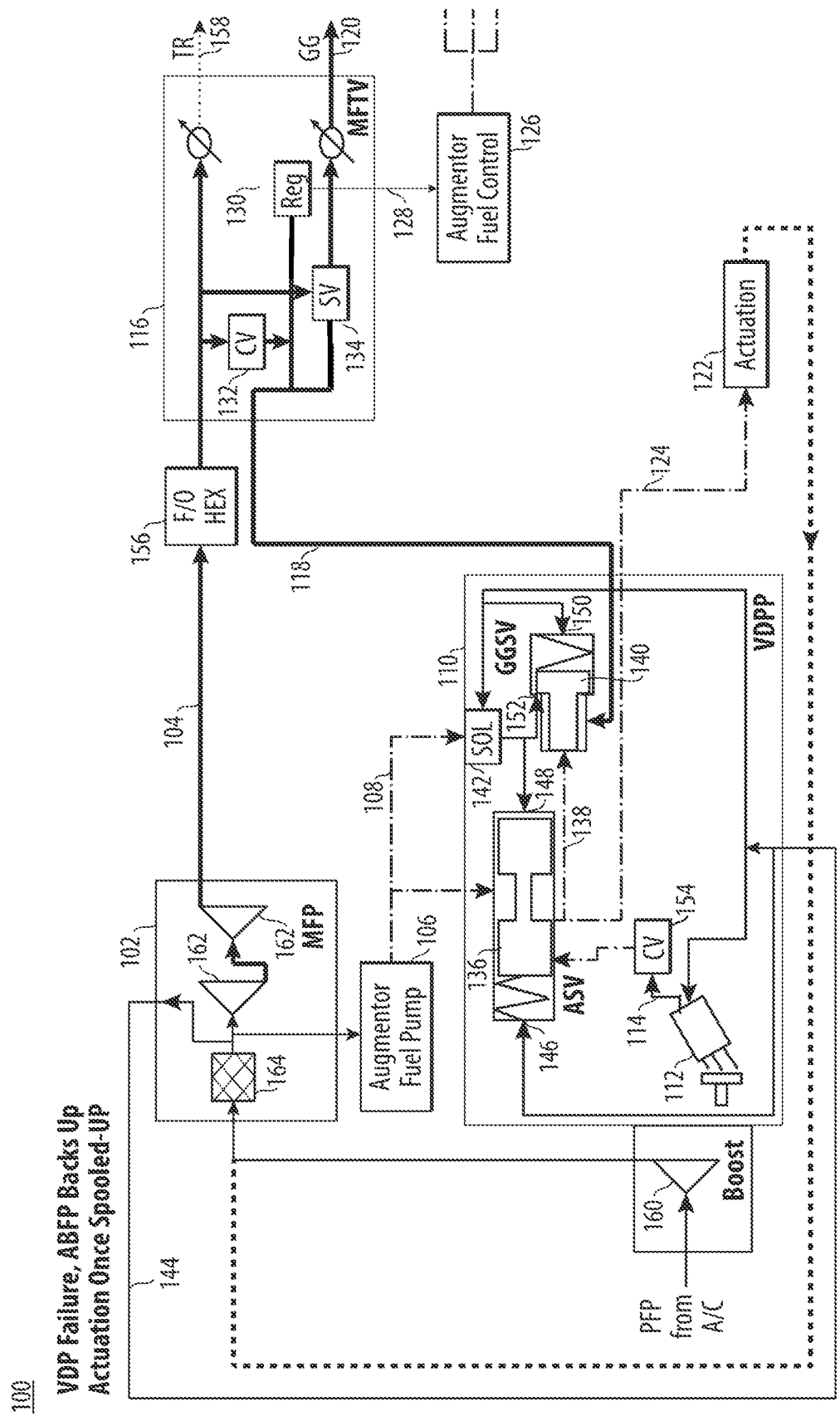
FIG. 4 is a schematic diagram of an embodiment of a fuel system in accordance with this disclosure, shown in a VDP failure mode.

Reference will now be made to the drawings wherein like reference numerals identify similar structural features or aspects of the subject disclosure. For purposes of explanation and illustration, and not limitation, an illustrative view of an embodiment of a fuel system in accordance with the disclosure is shown in FIG. 1 and is designated generally by reference character 100. Other embodiments and/or aspects of this disclosure are shown in FIGS. 2-4.

Referring to FIGS. 1-4, a fuel system 100 can include a main fuel pump (MFP) 102 configured to output main flow to a main line 104, an augmentor fuel pump (AFP) 106 configured to output an augmenter flow to an augmentor line 108, and a variable displacement pump assembly (VDPP) 110 in fluid communication with the AFP 106 via the augmentor line 108 to receive the augmentor flow. The VDPP 110 can include a variable displacement pump (VDP) 112 configured to output a VDP flow to a VDP output line 114. The system 100 can include a main fuel throttle valve assembly (MFTV) 116 in fluid communication with the main fuel pump 102 via the main line 104 to receive the main flow and in fluid communication with the VDPP 110 via a backup line 118. The MFTV 116 can be in fluid communication with an engine line 120, an actuation assembly 122 in fluid communication with the VDPP 110 via an actuation line 124 to receive an actuation flow.

In certain embodiments, in a start mode (e.g., as shown in FIG. 1), the VDPP 110 can be configured to output the VDP flow to the actuation line 124 and the backup line 118, and the MFTV 116 can be configured to output the VDP flow to the engine line 120. In certain embodiments, in a run mode (e.g., as shown in FIG. 2), the VDPP 110 can be configured to output the VDP flow to the actuation line 124 and the backup line 118, and the MFTV 116 can be configured to output the main flow to the engine line 120. In certain embodiments, in an initial VDP failure mode (e.g., as shown in FIG. 3), the MFTV 116 can be configured to output the main flow to the backup line 118 to provide the VDPP 110 with the main flow as well as provide main flow to the engine line 120, and the VDPP 110 can be configured to output the main flow to the actuation line 124 to provide the main flow to the actuation assembly 122. In certain embodiments, in a VDP failure mode (e.g., as shown in FIG. 4), the MFTV 116 can be configured to output the main flow to the backup line 118 to provide the VDPP 110 with the main flow as well as provide main flow to the engine line 120, and the VDPP 110 can be configured to output the augmentor flow to the actuation line 124 to provide the augmentor flow to the actuation assembly 122.

In certain embodiments, e.g., as shown in FIGS. 1-4, the system 100 can include an augmentor fuel control 126 in fluid communication with the MFTV 116 via an augmentor fuel control line 128 and configured to receive an augmentor fuel control flow from the MFTV 116. In certain embodiments, the MFTV 116 includes a regulator 130 connected between the backup line 118 and the augmentor fuel control line 128 such that the regulator 130 receives flow from the backup line 118 and outputs the augmentor fuel control flow.

In certain embodiments, e.g., as shown in FIGS. 1-4, the MFTV 116 can include an MFTV check valve (CV) 132 disposed between the main line 104 and the backup line 118. The MFTV CV 132 can be configured to open in the initial VDP failure mode to fluidly communicate the main line 104 with the backup line 118 to provide main flow to the VDPP 110. For example, the MFTV CV 132 can open when pressure on the main line 104 is suitably high to overcome pressure on the backup line 118 (e.g., and any bias within the MFTV CV 132).

In certain embodiments, e.g., as shown in FIGS. 1-4, the MFTV 116 can include a selector valve (SV) 134 connected between the backup line 118, the main line 104, and the engine line 120. The SV 134 can be configured to select between the main line 104 and the backup line 118 to fluidly communicate with the engine line 120. The selector valve 134 can be controlled by a control module configured to change the state of the selector valve 134 based on the mode of operation, for example. In certain embodiments, the selector valve 134 can be passively controlled by pressure differential between the main line 104 and the backup line 118, for example.

In certain embodiments, in the start-up mode, e.g., as shown in FIG. 1, the SV 134 can be configured to select the backup line 118 to fluidly communicate with the engine line 120. In certain embodiments, in all other modes as shown in FIGS. 2-4 (e.g., the run mode, the initial VDP failure mode, and the VDP failure mode), the SV 134 can be configured to select the main line 104 to fluidly communicate with the engine line 120.

In certain embodiments as shown in FIGS. 1-4, the VDPP 110 can include one or more valves configured to enable to the start mode, the run mode, the initial VDP failure mode, and the VDP failure mode. In certain embodiments, the one or more valves can include an actuation selector valve (ASV) 136 in fluid communication with the AFP 106 and the VDP 112. The ASV 136 can be configured to select between the VDP output line 114 and the augmentor line 108 to fluidly communicate with an ASV output line 138 and the actuation line 124. In certain embodiments, the one or more valves can include a backup selector valve (GGSV) 140 connected between the ASV output line 138 and the backup line 118.

In certain embodiments, e.g., as shown in FIG. 1-3, in the startup mode, the run mode, and the initial VDP failure mode, the ASV 136 can be configured to be in a first position to select the VDP output line 114 to fluidly communicate with the ASV output line 138 and the actuation line 124 to provide VDP flow to the ASV output line 138 and the actuation line 124, and the GGSV 140 can be configured to be in an open position to fluidly communicate the ASV output line 138 and the backup line 118 to provide VDP flow to the backup line 118. In certain embodiments, in the VDP failure mode, e.g., as shown in FIG. 4, the ASV 136 can be configured to be in a second position to select the augmentor line 108 to be in fluid communication with the ASV output line 138 and the actuation line 124 to provide augmentor flow to the ASV output line 138 and the actuation line 124, and the GGSV 140 can be configured to be in a closed position to prevent fluid communication of the ASV output line 138 and the backup line 118.

In certain embodiments as shown in FIGS. 1-4, the ASV 136 and the GGSV 140 are pressure controlled. In certain embodiments, the VDPP 110 can include a solenoid 142 in fluid communication with the augmentor line 108 and an input line 144 to output a solenoid control pressure to each of the ASV 136 and the GGSV 140. In certain embodiments, the ASV 136 can be biased to the second position and can include a first ASV control port 146 connected to the input line 144 and a second ASV control port 148 connected to the solenoid 142 to receive the solenoid control pressure. In certain embodiments, the GGSV 140 can be biased to the closed position and can include a first GGSV port 150 in fluid communication with the input line 144, and a second GGSV port 152 in fluid communication with the solenoid 142 to receive the solenoid control pressure. In certain embodiments, the VDPP 110 can include a VDP check valve (CV) 154 configured to prevent backflow to the VDP 112. (e.g., in the initial VDP failure mode).

In certain embodiments, the MFP 102 can include one or more centrifugal pumps 162. In certain embodiments, the system 100 can include a boost pump 160 connected configured to provide boost pressure to an input line 144. In certain embodiments, the system can include a heat exchanger 156 on the main line 104 (e.g., a fuel/oil heat exchanger for any suitable thermal purpose, e.g., to sink heat to the fuel). In certain embodiments, the MFP 102 can include a thermal recirculation line 158 in fluid communication with the main line 104.

Certain embodiments utilize a VDP for providing backup and actuation flow/pressure. Certain embodiments can ensure pressure control of an actuation system even in the event of a failure of the VDP, for example.

In certain embodiments, the AFP can be any type of pressure source, e.g., mechanically driven (e.g., a gearbox driven high speed pump) or electric motor driven, for example. The AFP can always be on, or turned on only when needed. In certain embodiments, there can be a pressure line from the output of the VDP to the AFP configured to maintain a certain pressure level to keep the ASV and the GGSV open.

In certain embodiments, the MFP can use centrifugal pumps. In certain embodiments, other types of pumps can be used for the MFP, e.g., one or more variable displacement pumps. In certain embodiments where the MFP is a type of pump other than a centrifugal pump, then the MFTV can be a pressure reducing valve (PRV) system or any other suitable system.

In certain embodiments, the system can include a filter 164 in the MP or in any other suitable location of the system. In certain embodiments, the system can include a thermal recirculation line 158, e.g., tank return.

In certain embodiments, the MFTV can include a regulator. The regulator can be used to regulate both the MFTV and the augmentor fuel control to regulate the shared control pressure. In certain embodiments, the SV selects pressure from either the MFP or the VDP. In the start mode, the VDP can provide pressure until the pressure of the MFP rises to a certain level. In certain embodiments, the MFTV can include an engine line 120 that flows to a gas generator/burner (GG).

In certain embodiments, the VDP can be a piston pump, or any other type of VDP (e.g., vane pump, etc.). In certain embodiments, filtered boost pressure can enter the VDP on an input line. The CV 154 in the VDPP, can prevent backward flow in the event of VDP failure, for example. The ASV selects the source pressure for the actuation.

In certain embodiments, the actuation of the system can be for an engine effector, turning the heat exchanger on/of, vane control, etc. Any suitable actuation system is contemplated herein. As shown in FIGS. 1-4, fuel can be bled back down to boost pressure after using actuation pressure (shown as the dotted line).

In certain embodiments, in the start mode as shown in FIG. 1, the backup line flows from VDP through the SV to the GG. The solenoid of the VDPP takes a higher pressure from AFP and maintains the ASV and the GGSV in position. This pressure can be higher than the boost pressure.

In certain embodiments in the run mode, e.g., as shown in FIG. 2, the MFP can pump through the SV. The VDP can pump to the actuation system, the SV, and the regulator in normal run mode. The SV can send MFP pressure to the engine line.

In certain embodiments, in the initial VDP failure mode, e.g., as shown in FIG. 3, initial failure can occur rapidly before a FADEC or other control module can detect the failure. The CV in the MFTV can open as soon as the VDP fails to allow MFP to pump back into VDP and provide actuation pressure. Under initial failure, the MFP is providing pressure to the actuation systems. During initial failure, the FADEC has not yet realized the failure (e.g., certain systems can take about 20-40 milliseconds for a FADEC to detect failure and about 100-200 millisecond to transition solenoids). In certain embodiments, the whole process from run mode (e.g., FIG. 2) to full VDP failure mode (e.g., FIG. 4) can be on the order of about 50-500 milliseconds. The CV in the VDPP can prevent high pressure flow backward.

In certain embodiments, in VDP failure mode, e.g., as shown in FIG. 4, a FADEC or other control module can control the solenoid to enable the AFP to provide pressure for actuation. The ASV can open to allow augmentor pressure due to a bias (e.g., when equal pressures on both sides/control ports). The GGSV can shut down due to bias (e.g., when equal pressure on both sides/control ports), e.g., so that the CV in the MFTV doesn't receive augmentor pressure to avoid toggling. In certain embodiments, the augmentor pressure can be higher or lower than the MFP, for example.

In certain embodiments, the system can include a VDP with direct pump displacement control via an EHSV or EMA and a pressure sensor. A pump position can be set to maintain a pressure and flow schedule to support flow demands for an actuation system to minimize actuation pumping horsepower. Through the use of an ASV, a GGSV, and solenoid (e.g., as described above), the pump can support a fuel system that utilizes a centrifugal main pump and throttle fuel control. The VDP can still be utilized to start the engine, and upon failure, the MFP can support actuation for a short duration while the AB pump is spooling up and once a full pressure the AB pump will take over the actuation demand.

Certain embodiments can provide for a more efficient actuation pump to be utilized, save horsepower, and improve transportation management system (TMS) loads.

Embodiments can include any suitable computer hardware and/or software module(s) to perform any suitable function (e.g., as disclosed herein). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel system, comprising:
   a main fuel pump (MFP) configured to output main flow to a main line;
   an augmentor fuel pump (AFP) configured to output an augmenter flow to an augmenter line;
   a variable displacement pump assembly (VDPP) in fluid communication with the AFP via the augmentor line to receive the augmentor flow, wherein the VDPP includes a variable displacement pump (VDP) configured to output a VDP flow to a VDP output line;
   a main fuel throttle valve assembly (MFTV) in fluid communication with the main fuel pump via the main line to receive the main flow and in fluid communication with the VDPP via a backup line, wherein the MFTV is in fluid communication with an engine line,
   an actuation assembly in fluid communication with the VDPP via an actuation line to receive an actuation flow;
   wherein in a start mode, the VDPP is configured to output the VDP flow to the actuation line and the backup line, and wherein the MFTV is configured to output the VDP flow to the engine line,
   wherein in a run mode, the VDPP is configured to output the VDP flow to the actuation line and the backup line, and wherein the MFTV is configured to output the main flow to the engine line,
   wherein in an initial VDP failure mode, the MFTV is configured to output the main flow to the backup line to provide the VDPP with the main flow as well as provide main flow to the engine line, and wherein the VDPP is configured to output the main flow to the actuation line to provide the main flow to the actuation assembly, and
   wherein in a VDP failure mode, the MFTV is configured to output the main flow to the backup line to provide the VDPP with the main flow as well as provide main flow to the engine line, and wherein the VDPP is configured to output the augmentor flow to the actuation line to provide the augmentor flow to the actuation assembly, wherein the VDPP includes one or more valves configured to enable to the start mode, the run mode, the initial VDP failure mode, and the VDP failure mode, wherein the one or more valves includes an actuation selector valve (ASV) in fluid communication with the AFP and the VDP, wherein the ASV is configured to select between the VDP output line and the augmentor line to fluidly communicate with an ASV output line and the actuation line, wherein the one or more valves includes a backup selector valve (GGSV) connected between the ASV output line and the backup line.

2. The system of claim 1, further comprising an augmentor fuel control in fluid communication with the MFTV via an augmentor fuel control line and configured to receive an augmentor fuel control flow from the MFTV.

3. The system of claim 2, wherein the MFTV includes a regulator connected between the backup line and the augmentor fuel control line such that the regulator receives flow from the backup line and outputs the augmentor fuel control flow.

4. The system of claim 3, wherein the MFTV includes an MFTV check valve (CV) disposed between the main line and the backup line, wherein the MFTV CV is configured to open in the initial VDP failure mode to fluidly communicate the main line with the backup line to provide main flow to the VDPP.

5. The system of claim 4, wherein the MFTV includes a selector valve (SV) connected between the backup line, the main line, and the engine line, wherein the SV is configured to select between the main line and the backup line to fluidly communicate with the engine line.

6. The system of claim 5, wherein in the start-up mode, the SV is configured to select the backup line to fluidly communicate with the engine line, wherein in all other modes, the SV is configured to select the main line to fluidly communicate with the engine line.

7. The system of claim 1, wherein in the startup mode, the run mode, and the initial VDP failure mode, the ASV is configured to be in a first position to select the VDP output line to fluidly communicate with the ASV output line and the actuation line to provide VDP flow to the ASV output line and the actuation line, and the GGSV is configured to be in an open position to fluidly communicate the ASV output line and the backup line to provide VDP flow to the backup line.

8. The system of claim 7, wherein in the VDP failure mode, the ASV is configured to be in a second position to select the augmentor line to be in fluid communication with the ASV output line and the actuation line to provide augmentor flow to the ASV output line and the actuation line, and the GGSV is configured to be in a closed position to prevent fluid communication of the ASV output line and the backup line.

9. The system of claim 8, wherein the ASV and the GGSV are pressure controlled.

10. The system of claim 9, wherein the VDPP includes a solenoid in fluid communication with the augmentor line and an input line to output a solenoid control pressure to each of the ASV and the GGSV.

11. The system of claim 10, wherein the ASV is biased to the second position and includes a first ASV control port connected to the input line and a second ASV control port connected to the solenoid to receive the solenoid control pressure.

12. The system of claim 11, wherein the GGSV is biased to the closed position and includes a first GGSV port in fluid communication with the input line, and a second GGSV port in fluid communication with the solenoid to receive the solenoid control pressure.

13. The system of claim 12, wherein the VDPP includes a VDP check valve (CV) configured to prevent backflow to the VDP.

14. The system of claim 13, wherein the MFP includes one or more centrifugal pumps.

15. The system of claim 1, further comprising a boost pump connected configured to provide boost pressure to an input line.

16. The system of claim 1, further comprising a heat exchanger on the main line.

17. The system of claim 1, wherein the MFP includes a thermal recirculation line in fluid communication with the main line.

* * * * *